(12) United States Patent
Bosseaux

(10) Patent No.: US 6,234,227 B1
(45) Date of Patent: *May 22, 2001

(54) TIRE ASSEMBLY DRUM

(75) Inventor: Bernard Bosseaux, Châtel-Guyon (FR)

(73) Assignee: Compagnie Generale des Etablissements Michelin - Michelin & Cie, Clermont-Ferrand Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,661

(22) Filed: Dec. 10, 1998

Related U.S. Application Data

(63) Continuation of application No. PCT/EP97/03024, filed on Jun. 11, 1997.

(30) Foreign Application Priority Data

Jun. 11, 1996 (FR) .................................................. 96 07324

(51) Int. Cl.⁷ .................................................. B29D 30/26
(52) U.S. Cl. .......................... 156/398; 156/135; 156/415; 156/417
(58) Field of Search ...................................... 156/131, 135, 156/398, 415, 111, 132, 414, 416–420

(56) References Cited

U.S. PATENT DOCUMENTS 3,822,165    7/1974   Habert .

FOREIGN PATENT DOCUMENTS

| 24 41 237  | 3/1976  | (DE) . |
| 0468580    | 1/1992  | (EP) . |
| 57-212046  | 12/1982 | (JP) . |
| 58-028366  | 2/1983  | (JP) . |
| 59-007034  | 1/1984  | (JP) . |
| 60-044329  | 3/1985  | (JP) . |

*Primary Examiner*—Geoffrey L. Knable
(74) *Attorney, Agent, or Firm*—Baker Botts L.L.P.

(57) ABSTRACT

A shaping drum for a tire having two bead holding systems mounted facing one another on a central shaft. Each of the bead holding systems includes a support mounted to be movable axially relative to the shaft. On each support there is mounted an assembly which includes a plurality of rigid segments and an elastic membrane which surrounds them. The rigid segments are each mounted on the support and swing about an articulation, the axis of which is perpendicular to a radial plane. A seat is formed on each assembly, the seat being arranged axially on the inside of the articulations, the articulations forming a crown on the support. The elastic membrane is fixed to the support axially on the inside and on the outside of the crown of articulations.

7 Claims, 2 Drawing Sheets

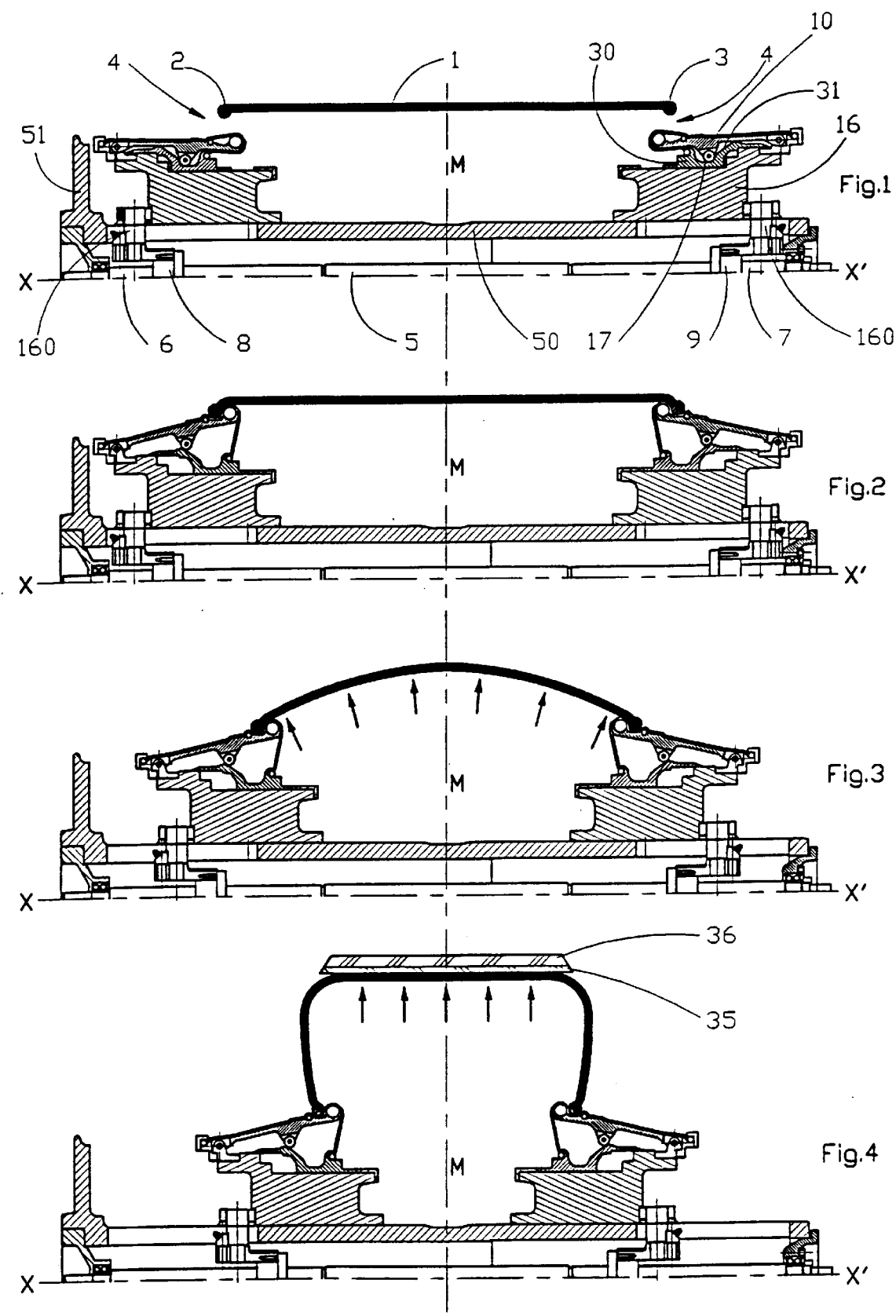

TIRE ASSEMBLY DRUM

This is a continuation of PCT/EP97/03024, filed Jun. 11, 1997.

BACKGROUND OF THE INVENTION

The subject of the present invention is a drum used for the assembly of tires. More precisely, the invention relates to a drum used for shaping during assembly.

One known technique for assembling a radial carcass tire comprises generally what is called a building stage followed by a shaping stage. During the first stage, generally carried out on a first drum, a first layer of air-impermeable rubber is typically laid on a cylindrical assembly drum having a horizontal axis. Then the carcass ply is laid, the reinforcement cords of which are substantially parallel to the axis of the drum. Then the two circular beads are built, each usually composed of a bead wire and a filler. Finally, the two edges of the carcass ply are turned up around the beads and the sidewalls are laid.

Having thus obtained a cylindrical carcass, it is necessary to pass to the shaping stage to impart to the carcass a roughly toroidal shape before laying the tread on the periphery thereof. Most frequently, this carcass is transferred onto another drum, referred to as a second-stage or shaping drum, comprising two bead holding systems intended to receive the beads. Then the two bead holding systems are brought together axially simultaneously while shaping the tire by inflation.

Finally, a crown, or cylindrical reinforcement, and the tread, are laid on the carcass thus shaped. The raw tire is then ready for curing in a mold, in which vulcanization will impart the final shape thereto. A shaping drum without a membrane is described in U.S. Pat. No. 3,402,090 (see in particular FIG. 2 thereof) which is formed of two bead holding systems which are radially expandable to be able to be applied in tight manner to the interior of the beads, before being brought together to shape the carcass by inflation. U.S. Pat. No. 4,325,764 describes another device of the same type, in which the bead holding systems of the beads comprise an internal axial circular stop. Once the carcass has been laid on the two bead holding systems, one begins by moving the bead holding systems apart from each other in order to bring the carcass into abutment, which results in it being properly centered. Then the bead holding systems are radially expanded and brought together, as above.

Shaping of a tire carcass is performed in the same way with the drum described in patent application JP 59 007 034, in which the two bead holding systems are made of radially expandable segments partially covered by an elastic membrane.

However, it has for a long time been noted that the shaping operation is still a critical phase. In fact, for certain bead structures, it requires a rotational movement of the beads on themselves, accompanied by friction on said bead holding systems. This subjects the beads to very great stresses. Since at this stage of manufacture the various components of the beads are still in the raw state, they undergo deformations which are sometimes detrimental to the final quality of the tire.

Various solutions for facilitating this rotation of the beads have therefore been proposed. One of these consists in equipping the bead holding systems, which generally comprise a rigid circular support, with membranes which can be deformed or displaced at the time of shaping the carcass, accompanying the rotation of the beads to some extent. U.S. Pat. No. 5,246,515 relates to the assembly of tires for aircraft, which have particularly voluminous beads.

The device described comprises bead holding systems formed of radially expandable, fluted segments, covered by an elastic membrane which surrounds a circular return filler. At the time of rotation of the beads, the elastic membrane, clamped between the latter and the associated bead holding systems, becomes taut, deforming the filler, and accompanies the movement of the bead. However, this system has one disadvantage: the friction of the elastic membrane on the surface which supports it, during the rotation of the beads. Furthermore, the patent provides for lubrication of this zone in order to reduce the friction therein.

SUMMARY OF THE INVENTION

The present invention proposes a shaping drum for a tire, comprising two bead holding systems mounted opposite one another on a central shaft, each of the bead holding systems comprising:

a support mounted to be mobile axially relative to said shaft, on the support, an assembly comprising a plurality of rigid segments distributed in a circle around said shaft, and an elastic membrane at least partially covering said rigid segments, these each being mounted on said support, swinging round an articulation, the axis of which is perpendicular to a radial plane, a seat being formed on each assembly, said seat being formed on said membrane axially on the inside relative to said articulations, said articulations forming a crown on said support, said elastic membrane being fixed to the support axially on the inside of the crown of the articulations, said drum comprising sealing means between said shaft and each of said supports, and also means for conveying a pressurization fluid into the space around the central shaft defined by each of said supports, and the elastic membrane comprising an outer elastic fastening situated at a distance from the axially inner end of the segments which is greater than three times the width of the seat of the bead.

During the operation of the drum, when the segments move radially apart while swinging, the seat is applied beneath the beads with a slight axial displacement which tends to move the beads apart. The effect of this is to center the carcass and to position it accurately on the bead holding systems, before immobilizing and inflating it. Secondly, the elastic membrane which surrounds the bead holding systems is of a length such that it can stretch readily and follow the movement of the beads during their positioning and their rotation. By selecting the materials, and possibly owing to judicious surface treatment of the segments, the friction is extremely limited, which considerably improves the quality of the product.

DESCRIPTION OF DRAWINGS

The invention will be better understood from the following description of an example given in non-limitative manner, referring to the appended drawings, in which:

FIGS. 1 to 4 are radial half-sectional views at successive stages of the implementation of the drum which is the subject of the invention.

DESCRIPTION OF PREFERRED EMBODIMENTS

Figure 5:
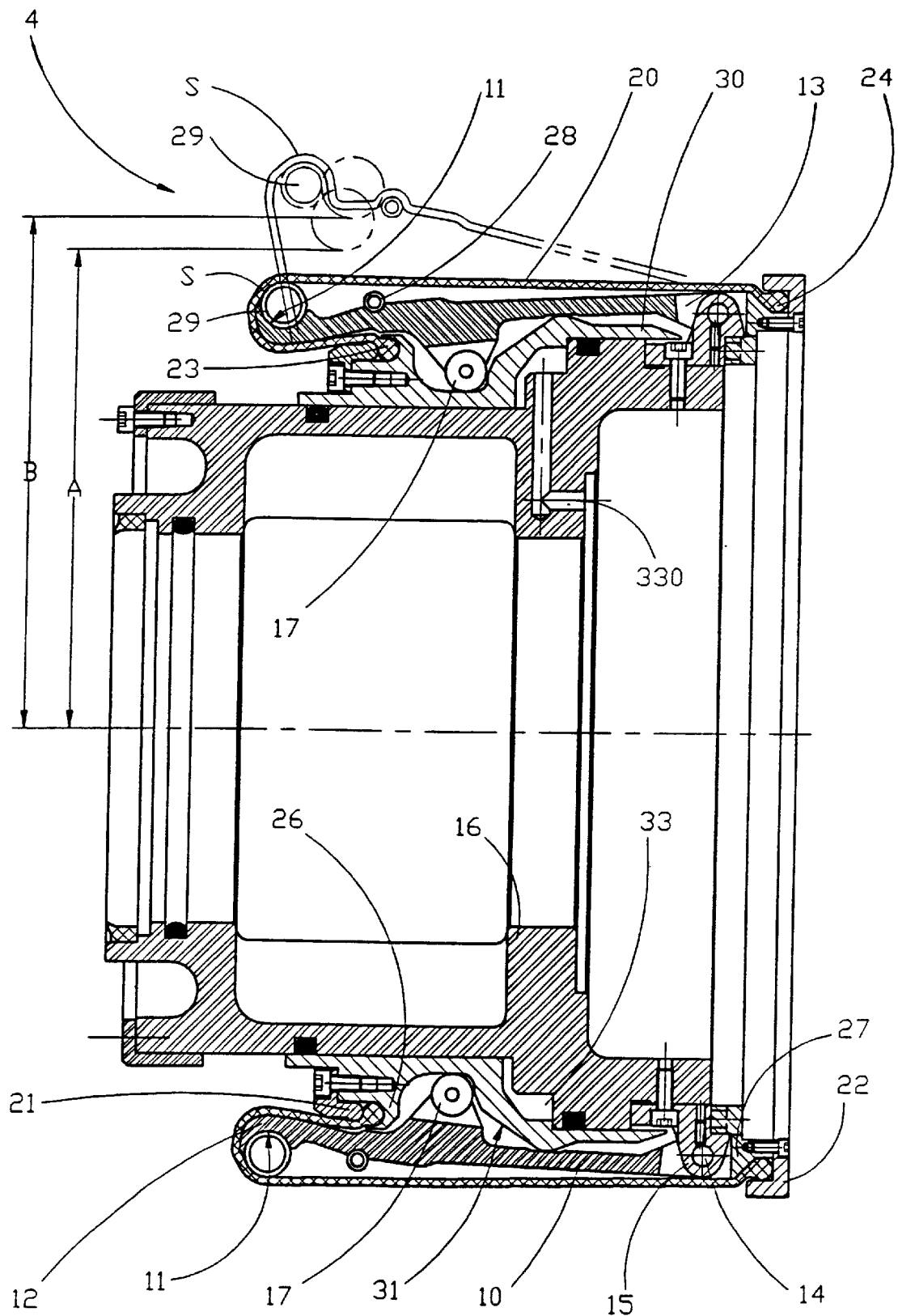
FIG. 5 is a more detailed sectional view of the bead holding system according to the invention.

FIGS. 1 to 4 show the upper half of a sectional view in a radial plane, that is to say, passing through the horizontal axis X–X' of the drum which is the subject of the invention. There can be seen therein a cylindrical carcass 1, with its two beads 2 and 3, at the end of the transfer to the shaping drum. The two circular beads of this carcass are arranged around two circular, coaxial bead holding systems designated as a whole by the reference 4. Said bead holding systems are mounted on a barrel 50, one end of which comprises a side plate 51 making it possible to mount the drum on an assembly machine.

The barrel 50 contains a rotary shaft 5 which makes it possible to control the relative axial movement of the bead holding systems 4. To this end, the shaft comprises zones 6 and 7 threaded with two inverted pitches which cooperate with two threaded sleeves 8 and 9 which actuate the bead holding systems 4 by means of fingers 160 each driving a support 16.

Each of these bead holding systems (see in particular FIG. 5) is essentially formed of a support 16, a plurality of rigid segments 10 and an elastic membrane 20 which encloses the segments, in the manner which will be explained below.

Each rigid segment 10 has a recess 11 formed on its axially inner end 12. A circumferential spring 29 is arranged in the recesses 11 of all the segments 10, so as to effect the return into the restrained position of the segments 10. The spring 29 furthermore forms a protrusion on each segment. The circumferential spring 29 is placed beneath the elastic membrane 20, which creates a corresponding annular projection S in the latter, the function of which will be explained below.

The segments 10 can swing radially by their axially outer ends 13, that is to say by their ends opposed to the median plane M, round articulations 14. These articulations are held by devises 15 integral with the support 16, the array of articulations pivotally mounted on clevises forming a crown on the support. Finally, the segments 10 are provided on their radially inner side with at least one roller 17, the function of which will be explained in detail further below.

The elastic membrane 20 surrounding the segments 10 is fixed by means of two hoops, one 21 located axially inside the articulations 14 and the other 22 axially outside the articulations 14. To this end, the elastic membrane 20, which is of substantially cylindrical shape, comprises on its edges two circular beads 23 and 24 which are secured tightly between flanges 26 and 27 on the supports 16, on one hand, and said hoops 21 and 22, on the other hand. Each flange 27 is mounted on the devises 15 of each support 16.

Of course, it is also possible to conceive of the covering of the segments 10 by the elastic membrane 20 being only partial, by nevertheless providing for the length of cover to be sufficient to permit the movement of the beads to be followed and to permit rotation.

Finally, a slide 30 is mounted to be axially movable relative to said segments and to said support. The slide 30 comprises a face forming a cam 31 which is inclined relative to the axis of the drum, defining a conic surface so as to form a ramp which cooperates with the rollers 17. The slide 30 can move on the support 16 under the action of a single-action piston-cylinder unit 33, the pneumatic control lines 330 of which can be seen. The return is ensured essentially by the spring 29. Note also that, according to a preferred embodiment of the invention, the axially inner fixing means of said membrane 20 is integral with said slide. Furthermore, preferably, said axially inner fixing means is located radially beneath said segments 10 when they are in the restrained position.

Note also that, in order to facilitate the rotary movement of the bead during shaping, it is preferable for the distance between the axially outer fixing means of said membrane and the axially inner end of said segments to be relatively large, for example more than three times the width of the seat of the bead. In the example described, a second spring 28 also contributes to defining the seat. In any case, the standard width of a bead produced on a given drum does not vary within very wide proportions, which means that it is always possible to evaluate the axial width of the seat of the bead.

The successive stages of the implementation of the drum will now be described. Departing from the positions shown in FIG. 1, one begins by displacing the two slides 30, with the ramps 31, towards the median plane M. The effect of this is radially to raise the rollers 17 and to make the segments 10 swing round their articulations 14 radially towards the outside, that is to say, moving away from the axis X'X'.

The limit of this swinging is reached when the seat is in contact with the corresponding bead, in order to be able to ensure the tightness of the internal cavity defined by the carcass 1 and the bead holding systems 4.

The present invention has one important advantage: one and the same device as that which has just been described can be used for several dimensions of tires, or for several nominal diameters, which comes to the same thing. In FIG. 5, it can be seen how the same drum makes it possible to shape carcasses having, for example, nominal diameters of 14 inches (A) and 15 inches (B), according to the current standards.

During the swinging of the segments 10, the membrane 20 which surrounds them stretches without difficulty, in view of its great length, until the moment when the beads press radially on the seats (FIG. 2) and butt axially against the annular projection S due to the spring 29. It will be noted that the positioning of the carcass is extremely precise, since it is effected continuously, both radially and axially, and in a single operation.

The tightness of the carcass 1 on the bead holding systems 4 thus being obtained, the carcass is shaped as described above. The two bead holding systems are brought closer together by rotation of the shaft 5, which drives the two sleeves 8 and 9, axially actuating in their turn said bead holding systems, while injecting air under pressure into the carcass 1 (FIG. 3). In order to simplify the drawing, the inflation system for the carcass has not been shown. When the external diameter of the carcass reaches a predetermined value, the belt or belt reinforcement 35 and the tread 36 are laid (FIG. 4). It is then possible to continue to bring the two bead holding systems 4 closer together in order to finish shaping the carcass.

It is, of course, to be understood that modifications to the form or variants in the operation of the device which has just been described can be made by the person skilled in the art without departing from the scope of the invention.

I claim:

1. A shaping drum for accommodating bead rotation in the manufacture of a tire on the drum, the drum including two bead holding systems mounted opposite each other on a central shaft, each bead holding system comprising:
 a support movable axially relative to the shaft,
 a plurality of rigid segments distributed in a circular array around the shaft, an articulation for mounting an axially outer end of each segment on the support for swinging motion of an axially inner end about the articulation from a retracted position to a bead clamping position, an elastic membrane at least partially covering the rigid segments, a bead seat formed in the segments axially inside the articulations, an axially outer fastening and an axially inner fastening fixing the membrane on the support, the membrane defining a stretchable span between the two fastenings which stretchable span extends above the bead seats and around the swinging inner ends of the segments, the distance of the span of the membrane from the axially outer fastening to the axially inner swinging ends of the segments in retracted positions being greater than three times the width of the bead seat and the span of the membrane between the axially inner fastening and the inner ends of the segments in retracted positions being greater than the width of the bead seat, the said drum further comprising means for introducing a pressurizing fluid into the space about the central shaft for shaping the tire.

2. A drum as set forth in claim 1 in which, in each of the bead holding systems, the elastic membrane is fixed on the support so that the stretchable span extends entirely across the segments.

3. A drum according to claim 1 in which the stretchable span of the membrane between the inner swinging ends of the segments and the axially inner fastening extends beneath the axially inner ends of the segments spanning the bead seats in the retracted positions of the segments.

4. A drum according to claim 1, in which the support comprises a slide forming a cam with at least one ramp inclined relative to the axis of the drum, said slide being axially movable relative to said segments and to said support, and including rollers integral with said segments and cooperating with said cam to cause the swinging of said rigid segments.

5. A drum according to claim 4, in which the axially inner fixing means for said membrane is integral with the slide.

6. A drum according to claim 5, in which the axially inner fixing means is located radially beneath the segments when they are in the restrained position.

7. A drum according to claim 1, in which each rigid segment comprises a recess on its axially inner end, and including a spring arranged around the recesses of all the segments, so as to cause the return of the segments to a restrained position, said spring forming a projection on each segment, said projection defining a seat.

* * * * *

UNITED STATES PATENT AND TRADEMARK OFFICE
CERTIFICATE OF CORRECTION

PATENT NO.    : 6,234,227 B1
DATED         : May 22, 2001
INVENTOR(S)   : Bosseaux It is certified that error appears in the above-identified patent and that said Letters Patent is hereby corrected as shown below:

<u>Column 3,</u>
Line 27, "jection" should read -- trusion --.
Line 32, "devises" should read -- clevises --.

Signed and Sealed this

Second Day of April, 2002

Attest:

JAMES E. ROGAN
*Attesting Officer*     *Director of the United States Patent and Trademark Office*